(12) United States Patent
Tezuka

(10) Patent No.: US 11,454,946 B2
(45) Date of Patent: Sep. 27, 2022

(54) WAVEFORM DISPLAY DEVICE AND WAVEFORM DISPLAY METHOD

(71) Applicant: FANUC CORPORATION, Yamanashi (JP)

(72) Inventor: Junichi Tezuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/841,879

(22) Filed: Apr. 7, 2020

(65) Prior Publication Data
US 2020/0341446 A1 Oct. 29, 2020

(30) Foreign Application Priority Data
Apr. 25, 2019 (JP) .............................. JP2019-084417

(51) Int. Cl.
*G05B 19/23* (2006.01)
(52) U.S. Cl.
CPC .............. *G05B 19/231* (2013.01); *G05B 2219/37092* (2013.01)
(58) Field of Classification Search
CPC ........ G05B 19/231; G05B 2219/37092; G05B 19/4086; G05B 2219/35356
USPC .......................................................... 700/193
See application file for complete search history.

(56) References Cited

U.S. PATENT DOCUMENTS

| | | | | |
|---|---|---|---|---|
| 6,542,785 B1 * | 4/2003 | Honda | ............... | G05B 19/4099 700/186 |
| 2004/0181307 A1 * | 9/2004 | Hirai | .................. | G05B 19/4103 700/194 |
| 2011/0057599 A1 * | 3/2011 | Iwashita | ............ | G05B 19/4068 318/601 |
| 2013/0054182 A1 * | 2/2013 | Tezuka | ................. | G05B 19/408 702/141 |
| 2013/0138236 A1 * | 5/2013 | Nagaoka | ................ | G05B 19/19 700/108 |
| 2015/0100150 A1 * | 4/2015 | Ogawa | ................... | G05B 19/19 700/186 |
| 2016/0109873 A1 * | 4/2016 | Ogawa | ................ | G05B 19/401 700/180 |

(Continued)

FOREIGN PATENT DOCUMENTS

JP 2011-165066 8/2011

*Primary Examiner* — Kenneth M Lo
*Assistant Examiner* — Mohammed Shafayet
(74) *Attorney, Agent, or Firm* — Wenderoth, Lind & Ponack, L.L.P.

(57) ABSTRACT

A waveform display device includes a position information acquisition unit configured to acquire, from a controller for controlling a machine tool, position information indicating a position of a driving axis of the machine tool during machining of a workpiece, a machine information acquisition unit configured to acquire machine information indicating axis configuration of the machine tool, a machining point coordinate calculation unit configured to calculate a coordinate of a machining point of a tool installed to the machine tool, on the basis of the position information and the machine information, a reference surface setting unit configured to set a targeted machining surface of the workpiece as a reference surface, a distance calculation unit configured to calculate distance from each of a plurality of the machining to the reference surface, and a waveform display unit configured to display the calculated distances of the plurality of machining points in a wave form.

6 Claims, 6 Drawing Sheets

(56) References Cited

U.S. PATENT DOCUMENTS

2016/0299488 A1\* 10/2016 Ogawa ............... G05B 19/4065
                                                        700/180
2020/0166906 A1\* 5/2020 Wang ................. G05B 19/4069

\* cited by examiner

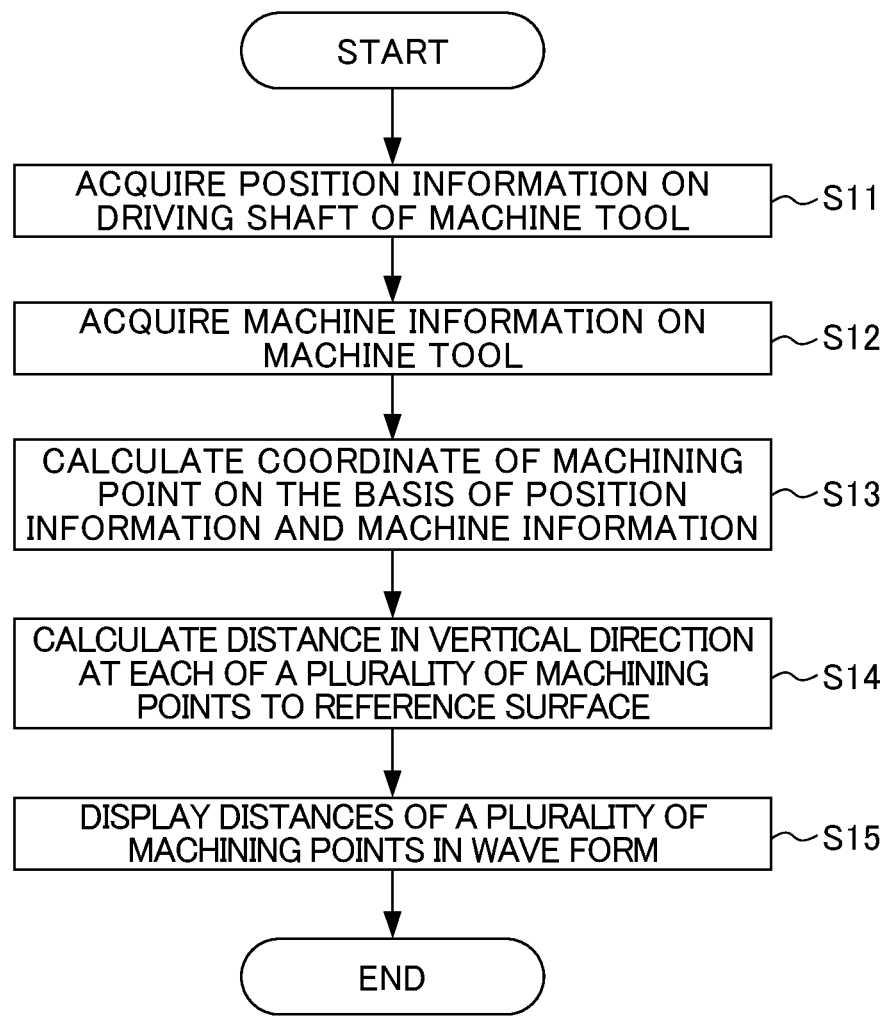

WAVEFORM DISPLAY DEVICE AND WAVEFORM DISPLAY METHOD

This application is based on and claims the benefit of priority from Japanese Patent Application No. 2019-084417, filed on 25 Apr. 2019, the content of which is incorporated herein by reference.

BACKGROUND OF THE INVENTION

Field of the Invention

The present invention relates to a waveform display device and a waveform display method.

Related Art

A machine tool is capable of variously shaping a workpiece by cutting or the like in response to the command input by a numerical controller on the basis of a machining program. However, there is an error between the machining point to be machined by a tool indicated in the machining program and the machining point actually machined by the tool of the machine tool.

In a known art for grasping the error, the path of the machining points of the tool actually measured by the numerical controller is displayed so as to be superimposed on the path of the machining points of the tool indicated in the machining program. (refer to, for example, Patent Document 1).

Patent Document 1: Japanese Unexamined Patent Application, Publication No. 2011-165066

SUMMARY OF THE INVENTION

In analyzing the effects of operation of the tool on a machining surface, the vertical component of the error with respect to a targeted machining surface is the most important in the components of the error. However, in some cases, it is difficult to grasp only such a vertical component of the error through the comparison between the path of the machining points of the tool indicated in the machining program and the actually measured path of machining points of the tool.

To deal with this, the error in the vertical direction is desired to be grasped easily.

A waveform display device in one aspect of the present disclosure includes a position information acquisition unit configured to acquire, from a controller for controlling a machine tool, position information indicating a position of a driving axis of the machine tool during machining of a workpiece, a machine information acquisition unit configured to acquire machine information indicating axis configuration of the machine tool set to perform the machining of the workpiece, a machining point coordinate calculation unit configured to calculate a coordinate of a machining point of a tool installed to the machine tool, on the basis of the position information and the machine information, a reference surface setting unit configured to set a targeted machining surface of the workpiece as a reference surface, a distance calculation unit configured to calculate distance from each of a plurality of the machining points calculated by the machining point coordinate calculation unit to the reference surface set by the reference surface setting unit, and a waveform display unit configured to display the calculated distances of the plurality of machining points in a wave form.

A waveform display method in one aspect of the present disclosure includes a position information acquisition step of acquiring, from a controller for controlling a machine tool, position information indicating a position of a driving axis of the machine tool during machining of a workpiece, a machine information acquisition step of acquiring machine information indicating axis configuration of the machine tool set to perform the machining of the workpiece, a machining point coordinate calculation step of calculating a coordinate of a machining point of a tool installed to the machine tool, on the basis of the position information and the machine information, a reference surface setting step of setting a targeted machining surface of the workpiece as a reference surface, a distance calculation step of calculating distance from each of a plurality of the machining points calculated in the machining point coordinate calculation step to the reference surface set in the reference surface setting step, and a waveform display step of displaying the calculated distances of the plurality of machining points in a wave form.

Each of the aspects allows to easily grasp the error in the vertical direction.

BRIEF DESCRIPTION OF THE DRAWINGS

FIG. 4 is a flowchart for describing display processing of a waveform display device.

DETAILED DESCRIPTION OF THE INVENTION

Figure 1:
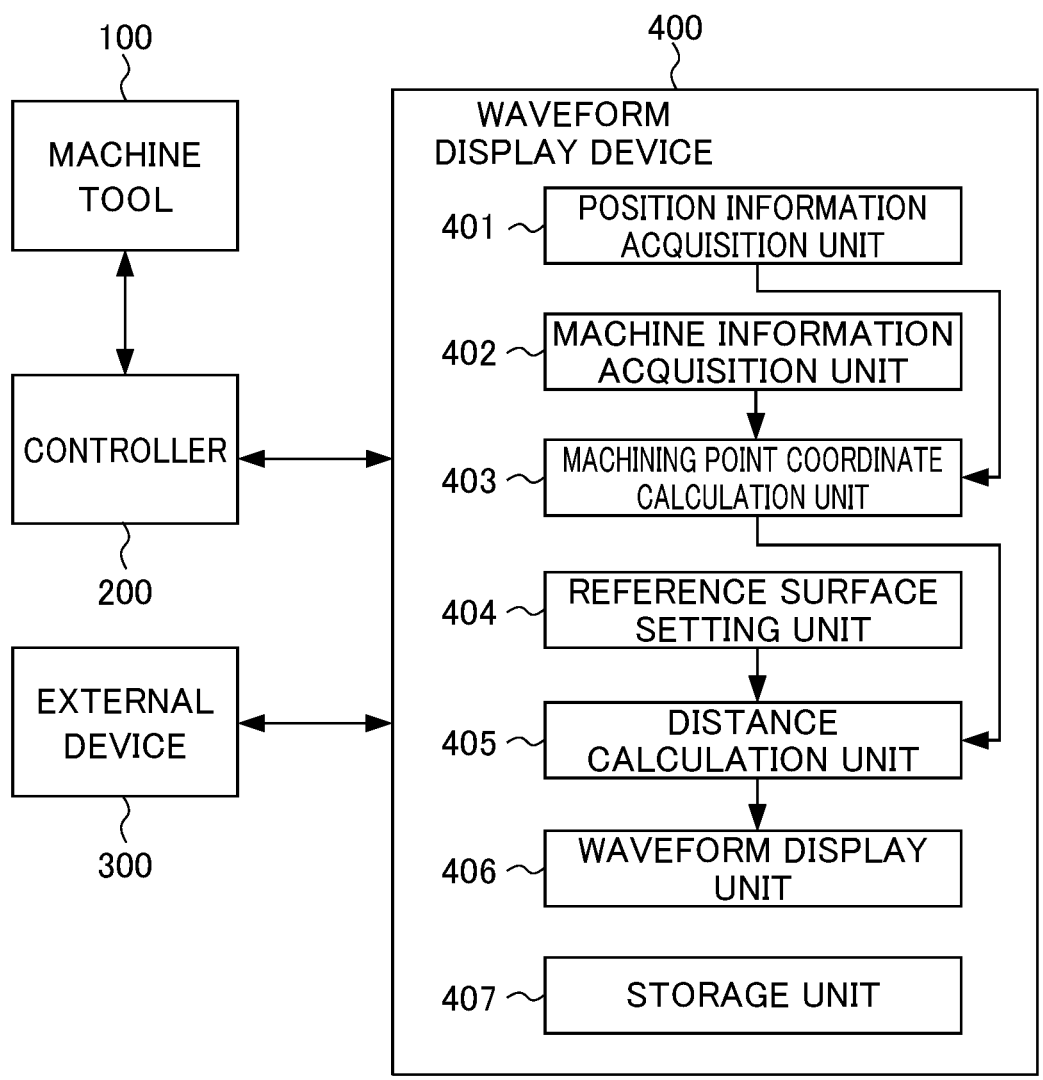
FIG. 1 is a functional block diagram illustrating a functional configuration example of a numerical control system according to one embodiment.

An embodiment according to the present disclosure will be described below by referring to the drawings.

Embodiment

FIG. 1 is a functional block diagram illustrating a functional configuration example of a numerical control system according to the embodiment. As shown in FIG. 1, the numerical control system has a machine tool 100, a controller 200, an external device 300, and a waveform display device 400.

The machine tool 100, the controller 200, the external device 300, and the waveform display device 400 may be directly and mutually connected via a connection interface not shown. Alternatively, the machine tool 100, the controller 200, the external device 300, and the waveform display device 400 may be mutually connected via a network not shown such as a LAN (local area network) or the Internet.

The machine tool 100, which is operated by the numerical control performed by the controller 200, is a machining device having at least one driving axis (not shown) such as of a servo motor. The machine tool 100 feeds back, to the controller 200, the information indicating operation status based on the operation command calculated by the controller 200, for example, the position information indicating the position of the driving axis not shown.

The controller 200, which is a numerical controller known to a person skilled in the art, controls the operation of the machine tool 100.

The external device 300, which is a computer device or the like, sets a targeted machining surface of a workpiece to be machined by the machine tool 100, as a reference surface into the waveform display device 400, as described later.

<Waveform Display Device 400>

The waveform display device 400 is configured with a position information acquisition unit 401, a machine information acquisition unit 402, a machining point coordinate calculation unit 403, a reference surface setting unit 404, a distance calculation unit 405, a waveform display unit 406, and a storage unit 407.

It is noted that the waveform display device 400 includes an arithmetic processing unit (not shown) such as a CPU (central processing unit) so as to realize operation of the functional blocks shown in FIG. 1. The waveform display device 400 includes an auxiliary storage device (not shown) such as a ROM (read only memory) or an HDD (hard disk drive) which stores various types of programs for control, and/or a main storage device (not shown) such as a RAM (random access memory) which stores data temporarily required when the arithmetic processing unit executes programs.

In the waveform display device 400, the arithmetic processing unit reads out OS and application software from the auxiliary storage device, and performs the arithmetic processing based on the read-out OS and application, while developing the read-out OS and application software in the main storage device. The waveform display device 400 controls the respective devices of hardware on the basis of the arithmetic results. As a result, the processing by the functional blocks shown in FIG. 1 is realized. In other words, the hardware and the software cooperatively function so that the waveform display device 400 is realized.

The position information acquisition unit 401 acquires, from the controller 200, the position information indicating the position of the driving axis (not shown) of the machine tool 100 during the machining of a workpiece. The position information acquisition unit 401 outputs the acquired position information to the machining point coordinate calculation unit 403.

The machine information acquisition unit 402 acquires, from the controller 200, the machine information indicating the axis configuration of the machine tool 100 set to perform the machining of the workpiece. It is noted that the machine information includes the type of the tool installed to the machine tool 100, the length of the tool, the shape of the tool, and the like. The machine information acquisition unit 402 outputs the acquired machine information to the machining point coordinate calculation unit 403.

The machining point coordinate calculation unit 403 calculates the coordinate (Xt, Yt, Zt) of the machining point machined by the tool installed to the machine tool 100, on the basis of the position information acquired by the position information acquisition unit 401, and the machine information acquired by the machine information acquisition unit 402. It is noted that the machining point is the position of the tip of a tool in many cases, but may not be the tip position. The coordinate of the machining point is able to be calculated by a known calculation method, and thus the detailed description thereof is omitted.

The reference surface setting unit 404 sets parameters a, b, c, d in Formula (1) below indicating the reference surface corresponding to a targeted machining surface of a workpiece, on the basis of the input operation performed by a user on the external device 300.

$$ax+by+cz=d \quad (1)$$

It is noted that the parameters a, b, c, d may be set on the assumption that a normal vector of the reference surface in Formula (1) is directed to the positive direction involved in the inner product of the normal vector and the vector (hereinafter, also referred to as "tool vector") directed from the tip to the root of the tool installed in the machine tool 100.

The distance calculation unit 405 calculates the distances respectively from the plurality of machining points calculated by the machining point coordinate calculation unit 403 to the reference surface set by the reference surface setting unit 404, that is, the distances in the vertical direction to the reference surface.

More specifically, the distance calculation unit 405 calculates a distance L from each of the plurality of machining points to the reference surface in the vertical direction, by use of Formula (2) and each of the coordinates (Xt, Yt, Zt) of the plurality of machining points calculated by the machining point coordinate calculation unit 403.

$$L=(aXt+bYt+cZt-d)/(a^2+b^2+c^2)^{1/2} \quad (2)$$

It is noted that a distance L in the vertical direction calculated by Formula (2) is a positive value in the case where a machining point is set in the side of the normal vector directed with respect to the reference surface, and is a negative value in the case where a machining point is set in the opposite side of the normal vector directed with respect to the reference surface.

Figure 2:
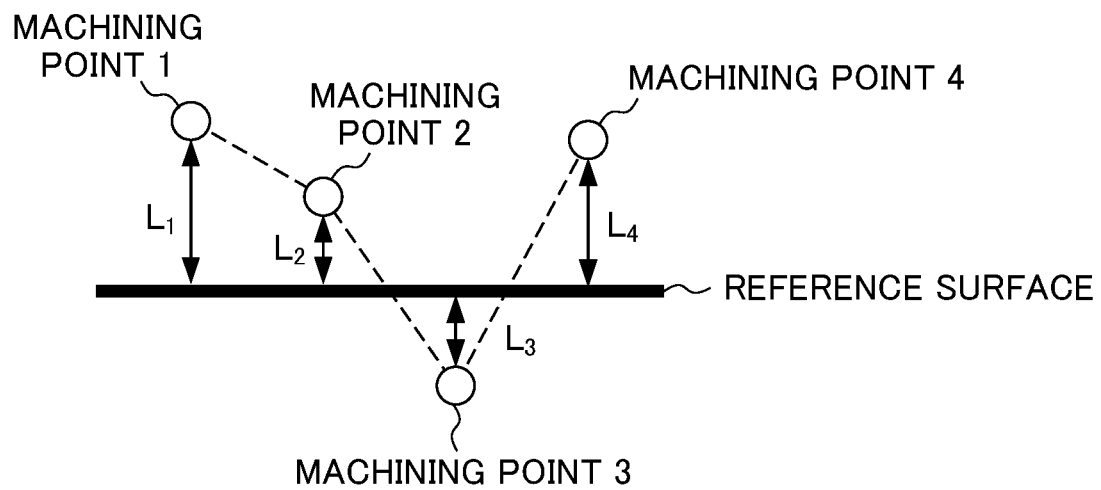
FIG. 2 is a diagram illustrating one example of the relation between machining points and a reference surface.

FIG. 2 illustrates one example of the relation between the machining points and the reference surface. FIG. 2 illustrates distances $L_1$ to $L_4$ in the vertical direction respectively at four machining points 1 to 4 with respect to the reference surface.

The distance calculation unit 405 outputs the calculated distances L of the plurality of machining points to the waveform display unit 406.

The waveform display unit 406 displays the distances L of the plurality of machining points calculated by the distance calculation unit 405 as a wave form on a display unit (not shown), for example, a liquid crystal display included in the controller 200.

Figure 3:
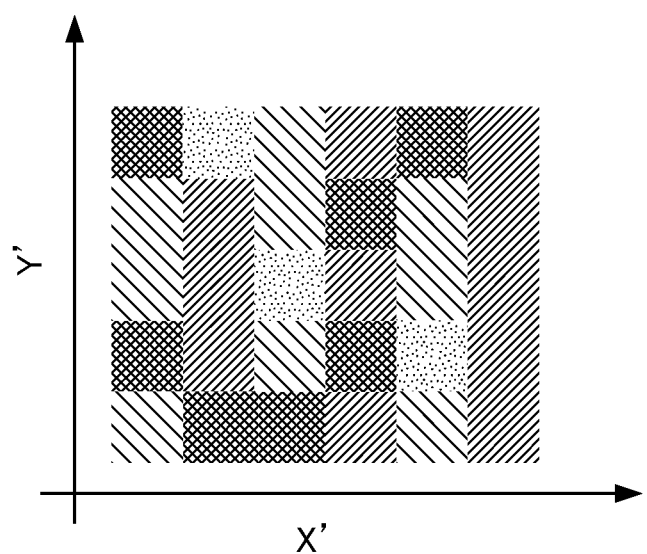
FIG. 3 is a diagram illustrating one example of display of distances at respective machining points.

More specifically, the waveform display unit 406 obtains coordinates (Xt', Yt') on an X' axis and on a Y' axis of the reference surface, by projecting the plurality of machining points respectively on the reference surface. The waveform display unit 406 plots, as shown in FIG. 3, the distances (error amounts) L of the coordinates (Xt', Yt') respectively of the plurality of machining points in various colors or in various shades of color on the X'Y' plane. FIG. 3 illustrates one example display of the distances L at the respective machining points.

It is noted that the X' axis and Y' axis on the reference surface may be set in parallel to the X axis and the Y axis of the machine coordinate system of the machine tool 100 or a workpiece coordinate system, or may be set arbitrarily.

The storage unit 407, which is a RAM or the like, may store the position information, the machine information, the parameters a, b, c, d of the reference surface, and the distances L of the plurality of machining points.

<Display Processing by Waveform Display Device 400>

The next description is about the operation involved in the display processing performed by the waveform display device 400 according to the present embodiment.

FIG. 4 is a flowchart for describing the display processing performed by the waveform display device 400.

In step 211, the position information acquisition unit 401 acquires, from the controller 200, the position information indicating the position of the driving axis (not shown) of the machine tool 100 during the machining of a workpiece.

In step S12, the machine information acquisition unit 402 acquires, from the controller 200, the machine information indicating the axis configuration of the machine tool 100 set to perform the machining of the workpiece.

In step 213, the machining point coordinate calculation unit 403 calculates the coordinate (Xt, Yt, Zt) of the machining point machined by the tool installed to the machine tool 100, on the basis of the position information acquired in step S11 and the machine information acquired in step S12.

In step S14, the distance calculation unit 405 calculates the distance L in the vertical direction from each of the plurality of machining points calculated in step S13 to the reference surface, by use of Formula (2).

In step S15, the waveform display unit 406 displays the distances L in the vertical direction respectively from the plurality of machining points calculated in step S14 to the reference surface, as a wave form on the display unit (not shown) of the controller 200.

As described above, the waveform display device 400 according to the embodiment calculates the distances L in the vertical direction at the plurality of machining points with respect to the reference surface, and displays the calculated distances L at the plurality of machining points as a wave form, thereby enabling to easily grasp errors (distances L) in the vertical direction. The waveform display device 400 is then able to analyze the effects of the operation of the respective driving units (not shown) of the machine tool 100 on the actually machined surface.

The description so far is about the embodiment. The waveform display device 400 is not limited to the above-described embodiment. The present invention includes modifications, improvements and the like within the scope allowing to achieve the purpose.

<Modification 1>

In the above-described embodiment, the waveform display device 400 is provided separately from the controller 200. The controller 200 may include some or all of the functions of the waveform display device 400.

Alternatively, for example, a server may include some or all of the position information acquisition unit 401, the machine information acquisition unit 402, the machining point coordinate calculation unit 403, the reference surface setting unit 404, the distance calculation unit 405, the waveform display unit 406 and the storage unit 407 of the waveform display device 400. The respective functions of the waveform display device 400 may be realized by use of a virtual server function or the like on a cloud computing system.

Alternatively, the waveform display device 400 may be a distributed processing system in which the respective functions of the waveform display device 400 are distributed to a plurality of servers as appropriate.

<Modification 2>

Although in the above-described embodiment the waveform display device 400 sets the reference surface on the basis of the input operation performed by a user on the external device 300, the present invention is not limited thereto. In an example, the waveform display device 400 may acquire, from the controller 200, a command value of a machining point to the machine tool 100 based on a machining program, and may set the reference surface on the basis of the acquired command value.

For example, in the case of a machining program for shaping a workpiece to have a flat surface, the waveform display device 400 is able to set the parameters a, b, c, d of the reference surface in Formula (1), on the basis of at least three command values not on the same line for machining of the flat surface out of the command values of the machining points to the machine tool 100. It is noted that the waveform display device 400 may set one reference surface for all the machining points, or may variously set a reference surface for each group including some machining points.

<Modification 3>

Figure 5A:
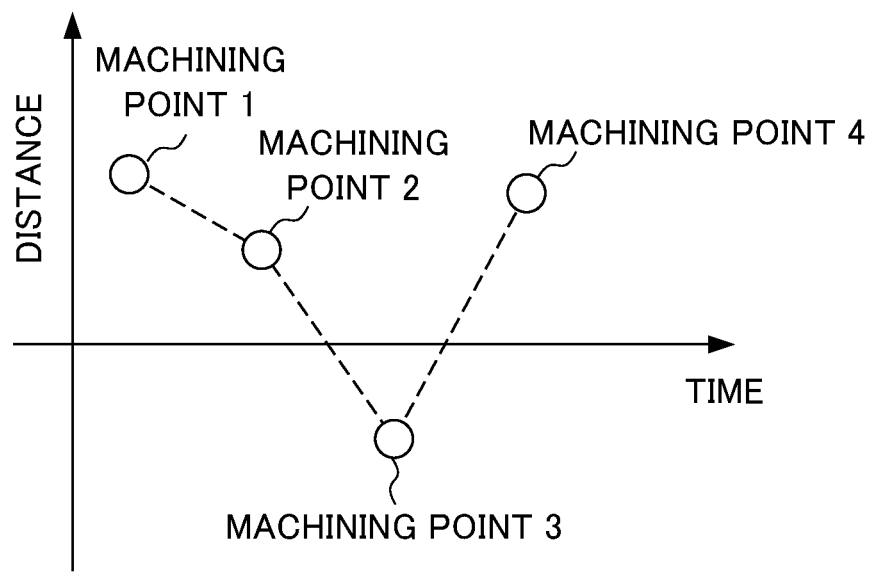
FIG. 5A is a diagram illustrating one example of the display of the distances at the respective machining points.

Although in the embodiment described above the waveform display device 400 plots the distances L in the vertical direction at the plurality of machining points with respect to the reference surface in various colors or in various shades of color on the X'Y' plane of the reference surface, the present invention is not limited thereto. The waveform display device 400 may display, as shown in FIG. 5A, the path of the machining points in a graph with the vertical axis thereof set as distance and the horizontal axis thereof set as time, by enlarging the distances (error amounts) L respectively at the plurality of machining points in the normal direction of the reference surface.

Figure 5B:
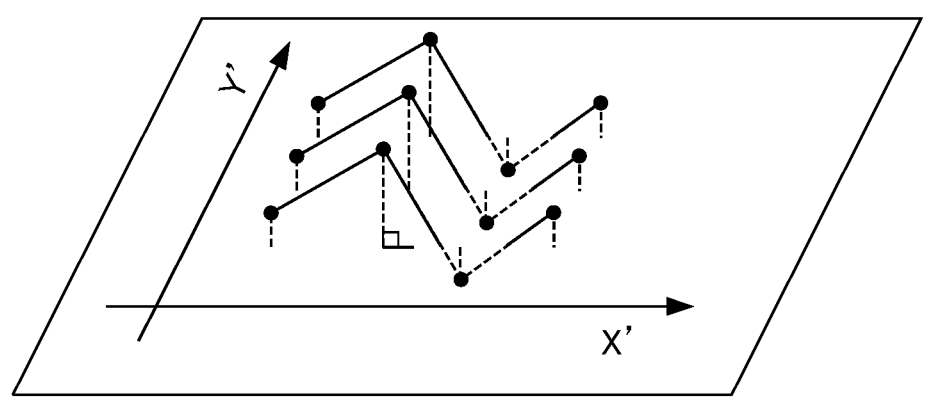
FIG. 5B is a diagram illustrating another example of the display of the distances at the respective machining points.

Alternatively, the waveform display device 400 may display, as shown in FIG. 5B, the path of the machining points in a three-dimensional manner, by enlarging the distances (error amounts) Z in the normal direction of the reference surface.

<Modification 4>

Although in the above-described embodiment the waveform display device 400 analyzes the effects of the operation of respective driving units (not shown) of the machine tool 100 on the actually machined surface, by displaying the distances L in the vertical direction at the plurality of machining points with respect to the reference surface in a wave form, the present invention is not limited thereto. In an example, the waveform display device 400 may compare the measurement values of the points at which unevenness (distances in the vertical direction) of the actually machined surface of the workpiece after cutting has been measured by a measuring device (not shown), and the distances L at the plurality of machining points, to analyze the cause of the errors on the machining surface.

In such comparison, the waveform display device 400 should directly compare a measurement value and a distance L at each of the plurality of machining points. However, as shown in FIG. 6, a measurement point measured by the measuring device (not shown) is not always identical with a machining point machined by a tool.

Figure 6:
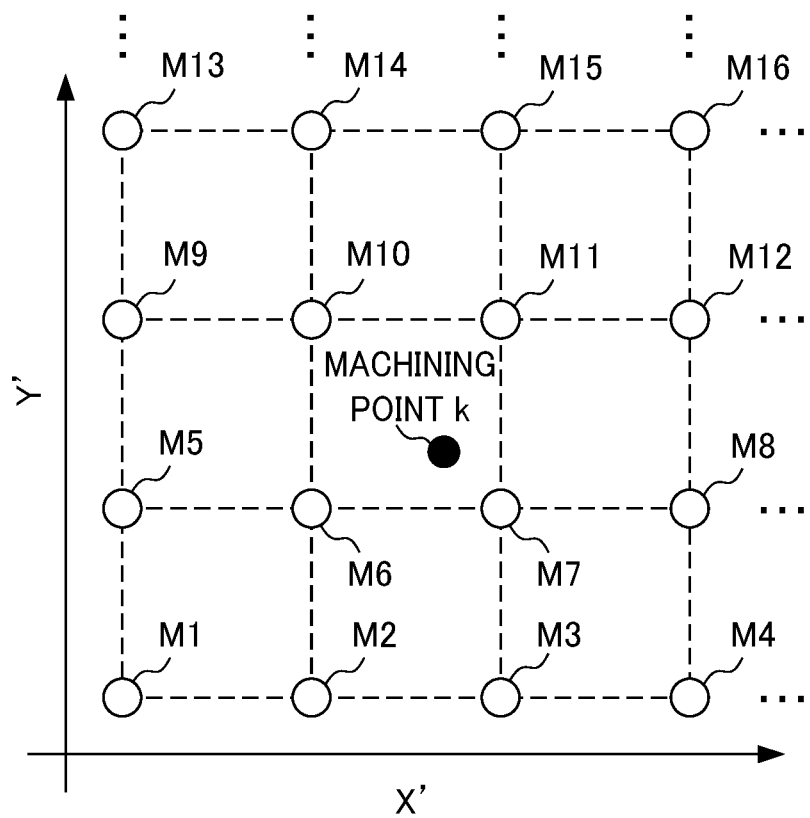
FIG. 6 is a diagram illustrating one example of the relation between machining points of a tool and the measurement point at which unevenness of the actually machined surface has been measured.

FIG. 6 illustrates one example of the relation between the machining points of the tool and the measurement point at which unevenness of the actually machined surface has been measured. FIG. 6 indicates measurement points M1 to M16 on a unit of the X'Y' plane of the reference surface, and further indicates a machining point k projected on the reference surface (k is an integer of 1 or greater).

The waveform display device 400 may then obtain the measurement value of the unevenness at the machining point k, by performing known complementary processing by use of measurement points existing in the vicinity of the coordinate (Xt', Yt') of the machining point k on the reference surface, for example, the measurement values of the measurement points M6, M7, M10, M11. In an example, the waveform display device 400 may superimpose the distances (error amounts) L of the plurality of machining points and the corresponding measurement values of the unevenness, to display the results in a wave form on the display unit (not shown) of the controller 200.

With such display, the waveform display device 400 is able to analyze the correlation between the distances (error amounts) L of the respective machining points and the corresponding measurement values of the unevenness, thereby enabling to analyze the cause of the errors on the machining surface.

It is noted that the functions included in the waveform display device 400 in the embodiment are able to be realized respectively by hardware, software, or a combination thereof. Being realized by software herein means that a computer reads and executes a program, whereby an embodiment is realized.

Programs are able to be stored by use of various types of non-transitory computer readable media, and are able to be supplied to a computer. Such non-transitory computer readable media include various types of tangible storage media. Examples of non-transitory computer readable media include a magnetic recording medium (for example, a flexible disk, a magnetic tape, a hard disk drive), a magneto-optical recording medium (for example, a magneto-optical disk), a CD-ROM (read only memory), a CD-R, a CD-R/W, and a semiconductor memory (for example, a mask ROM, a PROM (programmable ROM), an EPROM (erasable PROM), a flash ROM, a RAM). Programs may be supplied to a computer by use of various types of transitory computer readable media. Examples of transitory computer readable media include an electrical signal, an optical signal, and an electromagnetic wave. A transitory computer readable medium is capable of supplying a program to a computer via a wired communication path such as an electric wire and an optical fiber, or a wireless communication path.

It is noted that the step of describing a program to be stored in a recording medium includes not only the processing to be executed in time series in the order, but also the processing to be executed in parallel or individually, instead of being executed in time series.

In other words of the contents described so far, the waveform display device and the waveform display method according to the present disclosure are available in various types of embodiments having the following configurations.

(1) The waveform display device 400 of the present disclosure includes a position information acquisition unit 401 configured to acquire, from a controller 200 for controlling a machine tool 100, position information indicating a position of a driving axis of the machine tool 100 during machining of a workpiece, a machine information acquisition unit 402 configured to acquire machine information indicating axis configuration of the machine tool 100 set to perform the machining of the workpiece, a machining point coordinate calculation unit 403 configured to calculate a coordinate of a machining point of a tool installed to the machine tool 100, on the bass of the position information and the machine information, a reference surface setting unit 404 configured to set a targeted machining surface of the workpiece as a reference surface, a distance calculation unit 405 configured to calculate distance L from each of a plurality of the machining points calculated by the machining point coordinate calculation unit 403 to the reference surface set by the reference surface setting unit 404, and a waveform display unit 406 configured to display the calculated distances L of the plurality of machining points in a wave form.

The waveform display device 400 allows to easily grasp errors (distances L) in the vertical direction, by calculating the distances L from the plurality of machining points to the reference surface, and displaying the calculated distances L of the plurality of machining points in a wave form.

(2) The reference surface may be set by an external device 300.

Such setting allows to set an arbitrary machining surface as the reference surface.

(3) The reference surface may be set on the basis of a command value of the machining point to the machine tool 100 by the controller 200.

Such setting allows to set the reference surface corresponding to a machining program.

(4) The waveform display unit 406 may project the plurality of machining points on the reference surface, and may display the calculated distances L of the plurality of machining points on the reference surface in the colors or shades of color depending on the distances, in a wave form.

Such display allows to analyze the effects of the operation of respective driving units (not shown) of the machine tool 100 on an actually machined surface.

(5) The waveform display unit 406 may acquire measurement data measured by a measuring device, indicating unevenness of the actually machined surface of the workpiece after the machining, and may display in a wave form superimposing the distances of the machining points and measured values of the unevenness respectively at the plurality of machining points on the basis of the acquired measurement data.

Such display allows to analyze the correlation between the distances (error amounts) L at the respective machining points and the corresponding measurement values of the unevenness, and to further analyze whether or not the accuracy in the position control of the driving axis causes the errors on the machining surface.

(6) The waveform display method of the present disclosure includes a position information acquisition step of acquiring, from a controller 200 for controlling a machine tool 100, position information indicating a position of a driving axis of the machine tool 100 during machining of a workpiece, a machine information acquisition step of acquiring machine information indicating axis configuration of the machine tool 100 set to perform the machining of the workpiece, a machining point coordinate calculation step of calculating a coordinate of a machining point of a tool installed to the machine tool 100, on the basis of the position information and the machine information, a reference surface setting step of setting a targeted machining surface of the workpiece as a reference surface, a distance calculation step of calculating distance L from each of a plurality of the machining points calculated in the machining point coordinate calculation step to the reference surface set in the reference surface setting step, and a waveform display step of displaying the calculated distances L of the plurality of machining points in a wave form.

The waveform display method enables to exhibit the same effects as (1) described above.

EXPLANATION OF REFERENCE NUMERALS

100 MACHINE TOOL
200 CONTROLLER
300 EXTERNAL DEVICE

400 WAVEFORM DISPLAY DEVICE
401 POSITION INFORMATION ACQUISITION UNIT
402 MACHINE INFORMATION ACQUISITION UNIT
403 MACHINING POINT COORDINATE CALCULATION UNIT
404 REFERENCE SURFACE SETTING UNIT
405 DISTANCE CALCULATION UNIT
406 WAVEFORM DISPLAY UNIT

What is claimed is:

1. A waveform display device comprising:
a position information acquisition unit configured to acquire, from a controller for controlling a machine tool, position information indicating a position of a driving axis of the machine tool during machining of a workpiece;
a machine information acquisition unit configured to acquire machine information indicating axis configuration of the machine tool set to perform the machining of the workpiece;
a machining point coordinate calculation unit configured to calculate a coordinate for each of a plurality of machining points of a tool installed in the machine tool, on the basis of the position information and the machine information;
a reference surface setting unit configured to set parameters a, b, c, and d of an equation representing a reference surface corresponding to a targeted machining surface of the workpiece, the parameters being set based on at least three command values not on a same line for machining of a flat surface out of command values of the plurality of machining points to the machine tool based on a machining program;
a distance calculation unit configured to calculate a distance from each of the coordinates calculated for the plurality of the machining points to a vertical direction to the reference surface set by the reference surface setting unit; and
a waveform display unit configured to display the calculated distances in a waveform,
wherein the reference surface setting unit sets the parameters so that the reference surface that has a normal vector directed to a positive direction involved in an inner product of the normal vector and a tool vector, the tool vector being directed from a tip to a root of the tool installed in the machine tool, and
wherein the equation is defined as follows:

$$ax+by+cz=d,$$

where a, b, c, and d are the parameters set by the reference surface setting unit based on the at least three command values not on the same line for the machining of the flat surface out of the command values of the plurality of machining points to the machine tool based on the machining program, x represents x-axis in a three-dimensional Cartesian coordinate system, y represents y-axis in the three-dimensional Cartesian coordinate system, and z represents z-axis in the three-dimensional Cartesian coordinate system.

2. The waveform display device according to claim 1, wherein
the waveform display unit projects the plurality of machining points on the reference surface, and displays, in the waveform, the calculated distances on the reference surface in colors or shades of color depending on the calculated distances.

3. The waveform display device according to claim 1, wherein
the waveform display unit acquires measurement data including measured values measured by a measuring device, indicating unevenness of an actually machined surface of the workpiece after the machining, and
the waveform display unit displays, in the waveform, the calculated distances superimposed with the measured values of the unevenness respectively at the plurality of machining points on the basis of the acquired measurement data.

4. The waveform display device according to claim 1, wherein the distance calculation unit calculates the distance from each of the coordinates calculated for the plurality of the machining points as follows:

$$L_n=(aX_n+bY_n+cZ_n-d)/(a^2+b^2+c^2)^{1/2},$$

where a, b, c, and d are the parameters set by the reference surface setting unit based on the at least three command values not on the same line for the machining of the flat surface out of the command values of the plurality of machining points to the machine tool based on the machining program, $(X_n, Y_n, Z_n)$ is a coordinate point of n-th machining point of the plurality of the machining points, and Ln is the distance from the n-th machining point of the plurality of the machining points to the vertical direction to the reference surface set by the reference surface setting unit.

5. A waveform display method comprising:
a position information acquisition step of acquiring, from a controller for controlling a machine tool, position information indicating a position of a driving axis of the machine tool during machining of a workpiece;
a machine information acquisition step of acquiring machine information indicating axis configuration of the machine tool set to perform the machining of the workpiece;
a machining point coordinate calculation step of calculating a coordinate for each of a plurality of machining points of a tool installed in the machine tool, on the basis of the position information and the machine information;
a reference surface setting step of setting parameters a, b, c, and d of an equation representing a reference surface corresponding to a targeted machining surface of the workpiece, the parameters being set based on at least three command values not on a same line for machining of a flat surface out of command values of the plurality of machining points to the machine tool based on a machining program;
a distance calculation step of calculating a distance from the coordinate calculated for each of the plurality of the machining points to a vertical direction to the reference surface set in the reference surface setting step; and
a waveform display step of displaying the calculated distances in a waveform,
wherein the reference surface setting step sets the parameters so that the reference surface that has a normal vector directed to a positive direction involved in an inner product of the normal vector and a tool vector, the tool vector being directed from a tip to a root of the tool installed in the machine tool, and
wherein the equation is defined as follows:

$$ax+by+cz=d,$$

where a, b, c, and d are the parameters set in the reference surface setting step based on the at least three command values not on the same line for the machining of the flat surface out of the command values of the plurality of machining points to the machine tool based on the machining program, x represents x-axis in a three-dimensional Cartesian coordinate system, y represents y-axis in the three-dimensional Cartesian coordinate system, and z represents z-axis in the three-dimensional Cartesian coordinate system.

6. The waveform display method according to claim 5, wherein the distance calculation step calculates the distance from each of the coordinates calculated for the plurality of the machining points as follows:

$$L_n = (aX_n + bY_n + cZ_n - d)/(a^2 + b^2 + c^2)^{1/2},$$

where a, b, c, and d are the parameters set in the reference surface setting step based on the at least three command values not on the same line for the machining of the flat surface out of the command values of the plurality of machining points to the machine tool based on the machining program, $(X_n, Y_n, Z_n)$ is a coordinate point of n-th machining point of the plurality of the machining points, and Ln is the distance from the n-th machining point of the plurality of the machining points to the vertical direction to the reference surface set in the reference surface setting step.

* * * * *